(12) United States Patent
Tahon et al.

(10) Patent No.: US 7,288,150 B2
(45) Date of Patent: Oct. 30, 2007

(54) HOMOGENEOUS INCORPORATION OF ACTIVATOR ELEMENT IN A STORAGE PHOSPHOR

(75) Inventors: Jean-Pierre Tahon, Langdorp (BE); Johan Lamotte, Rotselaar (BE); Paul Leblans, Kontich (BE)

(73) Assignee: AGFA Gevaert, Mortsel (BE)

( * ) Notice: Subject to any disclaimer, the term of this patent is extended or adjusted under 35 U.S.C. 154(b) by 330 days.

(21) Appl. No.: 11/015,545

(22) Filed: Dec. 17, 2004

(65) Prior Publication Data
US 2005/0132951 A1 Jun. 23, 2005

Related U.S. Application Data

(60) Provisional application No. 60/535,923, filed on Jan. 12, 2004.

(30) Foreign Application Priority Data
Dec. 19, 2003 (EP) .................................. 03104842

(51) Int. Cl.
*C30B 11/02* (2006.01)
*G03B 42/00* (2006.01)

(52) U.S. Cl. ...................... 117/75; 117/87; 117/921; 250/327.2

(58) Field of Classification Search ................. 117/84, 117/75, 87, 921; 250/484.4, 584, 327.2
See application file for complete search history.

(56) References Cited

U.S. PATENT DOCUMENTS

| | | | | |
|---|---|---|---|---|
| 3,859,527 | A | * | 1/1975 | Luckey .......................... 250/581 |
| 5,055,681 | A | * | 10/1991 | Tsuchino et al. ............ 250/585 |
| 5,736,069 | A | * | 4/1998 | Willems et al. ...... 252/301.4 H |

| | | | | |
|---|---|---|---|---|
| 2003/0034458 | A1 | | 2/2003 | Isoda et al. .............. 250/484.4 |
| 2003/0042429 | A1 | | 3/2003 | Isoda ....................... 250/484.4 |
| 2003/0047697 | A1 | | 3/2003 | Iwabuchi et al. ............ 250/584 |

FOREIGN PATENT DOCUMENTS

| | | |
|---|---|---|
| EP | 0 174 875 | 3/1984 |
| EP | 1 065 523 | 1/2001 |
| EP | 1 113 458 | 7/2001 |
| EP | 1 217 633 | 6/2002 |
| EP | 1 286 365 | 2/2003 |
| EP | 1 316 970 | 6/2003 |
| EP | 1 316 971 | 6/2003 |
| EP | 1 316 972 | 6/2003 |
| EP | 1 341 188 | 9/2003 |
| EP | 1 347 460 | 9/2003 |
| EP | 1 349 177 | 10/2003 |
| EP | 1 376 614 | 1/2004 |
| WO | 01/03156 | 1/2001 |

OTHER PUBLICATIONS

European Search Report, Application No. 03 10 485=42, Apr. 16, 2004, Doslik.
Partial European Search Report, EP 04 10 6617, Mar. 14, 2005 Doslik, N.

* cited by examiner

*Primary Examiner*—Felisa Hiteshew
(74) *Attorney, Agent, or Firm*—Joseph T. Guy; Nexsen Pruet, LLC

(57) ABSTRACT

A method has been disclosed for manufacturing a storage phosphor for use in a photostimulable phosphor screen or panel comprising a support and a storage phosphor layer, wherein a dopant or activator is incorporated more homogeneously in amorphous and in crystalline phosphors as well, starting with a mixing step of said matrix component and activator component in stoechiometric ratios in order to provide a desired phosphor composition; and more particularly in order to prepare a $CsBr:Eu^{2+}$ phosphor having an optimized sensitivity with respect to its particle size.

25 Claims, No Drawings

HOMOGENEOUS INCORPORATION OF ACTIVATOR ELEMENT IN A STORAGE PHOSPHOR

The application claims the benefit of Ser. No. 60/535,923 Jan. 12, 2004.

FIELD OF THE INVENTION

The present invention relates to a method for preparing a storage phosphor wherein the dopant or activator element is incorporated more homogeneously.

BACKGROUND OF THE INVENTION

Storage phosphor screens are known in the art as screens wherein a latent X-ray image is stored when making use of a stimulable phosphor as a medium absorbing and storing radiation energy emitted by an X-ray source. Such X-rays, when having passed through an object (as e.g. a human body) provide the phosphor grains in the screen with a "latent image" which should be read out in order to make that "latent image" visible and ready for inspection by a medicine. Read-out of the X-ray image is achieved by exciting the phosphor with stimulating radiation (of longer wavelengths), thereby stimulating the phosphor to emit radiation of a shorter wavelength, which should be captured by a detector. Such a lumines-cent storage screen is disclosed, for example, in EP-A 0 174 875.

Holes become generated in the stimulable phosphor by incident radiant intensity, wherein these holes are stored in traps having a higher energy level, so that the latent X-ray image becomes stored in the screen, a process that seems to be very comparable with latent image formation in silver halide crystals in classical photography. Processing however proceeds in a quite differing way: whereas in classical silver halide photography wet processing of a silver halide film material proceeds in a processing cycle throughout the steps of developing, fixing, rinsing and drying, processing of digital images requires read-out of the entire area or surface of a storage screen or panel: stimulation, pixel-by-pixel, by another radiation source, e.g. a laser, causes stimulated radiation to leave the storage panel and to be detected by a detector. Due to the stimulation radiation, the energy of the holes stored in the traps is boosted and they can fall back into lower energy levels, whereby the energy difference is radiated in the form of light quanta. The stimulable phosphor thereby emits light dependent on the energy stored in the phosphor. The light emitted as a result of this stimulation is detected and rendered visible, so that the x-ray image which was latently stored in the screen can be read out. A problem in the read-out of such screens is that the stimulable phosphor is not sufficiently transparent for the stimulable laser light. A minimum thickness of the stimulable phosphor is required to be able to achieve adequate X-ray quantum absorptions. In case however of a non-transparent, tightly compressed or sintered phosphor, the laser beam is so greatly attenuated by the phosphor that the penetration depth of the laser beam is too small. Because the energy is no longer adequate for boosting the holes to the energy level required for quantum emission, the information stored in the deeper levels cannot be read out and speed of the storage phosphor screen is reduced. Moreover as the storage phosphor particles are embedded in a binder, it is important that the said binder is made of a light-transmissive carrier material, fixing the phosphor grains. Transparency for both stimulation and stimulated radiation is thus required, in favor of speed as has been disclosed in EP-A 1 376 614. Besides its influence on speed, influence on sharpness of the captured image is another weakness: incident radiation indeed spreads increasingly with increasing penetration depth, due to scattering of the radiation beam at the phosphor grains, so that the modulation transfer function of the overall system is degraded. Providing a binderless stimulable CsBr:Eu phosphor, prepared as described in EP-A 1 203 394 and vapor-deposited in needle-shaped form as disclosed in EP-A 1 113 458 onto a carrier in a high vacuum, was forming a suitable solution for an excellent speed-to-sharpness balance. As it was inevitable to have voids between the needles, further attempts to fill the said voids have more recently been described in EP-A's 1 316 970, 1 347 460, and 1 349 177, wherein filling voids has been realized by measures related with application of a radiation-curable protection layer liquid, a polymeric compound and sublimated dyes respectively. Filling the voids should be considered as an alternative for needle-shaped phosphors in order to avoid destruction of the needles by compression, as well-known applied technique for powder phosphors, in order to enhance their package density in a screen. It is not excluded that powder phosphors taking advantage with respect to speed by such compression action degrade with respect to sharpness as particle boundaries between powder particles may act as scatter centers for read-out radiation.

Further measures related with support or subbing layers onto said support, taken in favor of speed and sharpness for panels with same phosphors, have been described in recent EP-A's 1 316 972, 1 316 971 and 1 341 188.

Factors particularly related with intrinsic sensitivity of the phosphors are however, to a great extent, related with incorporation (volume distribution), amount and valency of the dopant or activator element. So it is clear that incorporation of divalent or trivalent Eu into a phosphor matrix structure composed of monovalent metal compound causes deformation of the prismatic phosphor crystalline structure.

So in U.S. application Ser. No. 2003/0,047,697 the Europium signal measured at the surface of the layer is larger than the Europium-activator signal measured in the bulk of the crystal layer. The surface of the phosphor is defined therein as "1% of the total thickness of the crystal layer". The problem is solved of "crack formation" in a layer of deposited alkali halide phosphors—by electron beam evaporation—and formation of undefined crystal face orientation in the layers, as a consequence of deformation of crystal lattice sturctures. A radiation image storage panel is claimed therein wherein both of the concentration of the activator component in the portion of from the bottom surface to depth of {fraction ($^{99}/_{100}$)} and the concentration of the activator component in the portion of from the upper surface to depth of {fraction ($^{1}/_{100}$)} satisfy, in a preferred embodiment, the condition of $0 \leq p/q < 0.1$, wherein p stands for the concentration in the portion of from the bottom surface to depth of {fraction ($^{99}/_{100}$)}, and q stands for the concentration in the portion of from the upper surface to depth of {fraction ($^{1}/_{100}$)}.

U.S. application Ser. No. 2003/0,042,429 further claims a relationship of a molar ratio of activator to mother component Ra in an optionally determined one position on the phosphor film and a molar ratio of activator element to mother component Rb in an optionally determined different position on the phosphor film, wherein said ratios are inbetween broad ratio values of 1:10 to 10:1, thereby providing a radiation image storage panel which shows specifically high sensitivity.

U.S. application Ser. No. 2003/034,458 moreover claims presence as a Eu activator in a CsX containing phosphor crystal of amounts, expressed as an atomic ratio in the range from $10^{-4}$ to $10^{-2}$ in order to reach the highest sensitivity of the storage phosphor thus obtained.

From the considerations related with speed of storage phosphor panels given hereinbefore, it is clear that there remains a stringent demand for measures in order to further enhance sensitivity, while overcoming all losses in speed.

OBJECTS AND SUMMARY OF THE INVENTION

Therefore it is an object of the present invention to provide a method for manufacturing a storage screen of the type described above which produces a storage screen having a high X-ray quantum absorption with high imaging sharpness, an excellent modulation transfer function, and a method in order to easy manufacture said phosphor.

The above object has been achieved in accordance with the present invention by applying a method for manufacturing a storage phosphor screen comprising an improved incorporation of dopant (activator) in a Europium doped alkali halide phosphor and, more particularly with a CsBr:Eu phosphor, in order to provide a higher sensitivity.

The above-mentioned advantageous effects have thus been realized by providing a phosphor sheet or panel having the specific features set out in claim 1. Specific features for preferred embodiments of the invention are set out in the dependent claims.

Further advantages and embodiments of the present invention will become apparent from the following description.

DETAILED DESCRIPTION OF THE INVENTION

The method of preparing a phosphor according to the present invention thus comprises the step of growing its surface by firing or evaporating as components composing the said phosphor, a matrix component and an activator element or dopant, wherein growing said phosphor, during a last incremental growth before ending said growth, proceeds over a distance q, expressed in μm, in its largest direction, provided that an increase of the said phosphor in volume, expressed in volume percentage, is more than 5%; and is characterized in that an activator element partition, determined before and after growth of a surface layer of said phosphor over a distance corresponding with q/10 satisfies the condition:

$$-(q/10)^{-1} < \text{rico} < 0$$

wherein said "rico" value, expressed in $\mu m^{-1}$, is calculated as a ratio of concentration differences between said activator concentration (1), determined at a depth of q/10 under said surface and said activator concentration (2) determined at said surface, and said activator concentration (2) determined at said surface, divided by the product of 0.1 times q.

In the method according to the present invention as set out hereinbefore, q equals a value of 50 μm for needle-, prismatic-, cylindrical- or block-shaped phosphor crystal, wherein its largest direction is its height direction.

In another embodiment of the method according to the present invention as set out hereinbefore, q equals a value of 2 μm for a globular phosphor crystal, wherein its largest direction is its diametrical height direction.

According to a preferred embodiment of the method of the present invention, components composing the said phosphor are a matrix component $(1-a)M^IX.aM^{II}X_2$, wherein M(I) is at least one of monovalent Li, Na, K, Rb or Cs, M(II) is a divalent metal element selected from the group consisting of Mg, Ca, Sr, Ba and Ni;

X is a halogen atom selected from the group consisting of F, Cl, Br and I; wherein $0 \leq a < 0.5$; and an activator element (dopant) Ln, wherein Ln stands for Sc, Y, La, Ce, Pr, Nd, Pm, Sm, Eu, Gd, Tb, Dy, Ho, Er, Tm, Yb, Lu, Al, Bi, In or Ga.

In a first embodiment according to the present invention, said method proceeds by growing a needle-, prismatic-, cylindrical- or block-shaped phosphor crystal at its growing surface in its height direction (longest side) by firing or evaporating as components composing the said phosphor the matrix and the activator element or dopant as set forth hereinbefore. For needle-shaped phosphors where q=50 μm the "rico"-value should be higher than −0.20, preferably higher than −0.05 and even more preferably higher than −0.01.

In a second embodiment according to the present invention, said method proceeds by growing a globular phosphor crystal at its growing surface in its diametrical height direction by firing or evaporating as components composing the said phosphor the matrix and the activator element or dopant as set forth hereinbefore. For globular powdery phosphors where q=2 μm the "rico"-value should be higher than −5.00 preferably higher than −4.50 and even more preferably higher than −4.00.

It is clear that measurements of the activator element partition should be performed as measurements of the activator element or dopant concentration to mother or matrix component concentration measured at a depth of 0.1 times q (corresponding with concentrations just before 1/10 of the last incremental growth step) and measurements of activator element or dopant concentration to mother component concentration measured after the said last 1/10th part of said incremental growth step from a depth of 0.1 times q to the surface (where concentrations of activator or dopant are reached at the phosphor surface, just after the said last incremental growth step) should thus be measured, and wherein those differences should be divided by differences in site depth (from a depth of 0.1 times q before the last 1/10th part of the last incremental growth step, up to the phosphor crystal surface), so that the "rico" parameter gets expressed in $\mu m^{-1}$.

According to the method of the present invention, while growing as a needle-, prismatic-, cylindrical- or block-shaped phosphor crystal q equals a value of 50 μm (and q/10 thus equals 5 μm), and q corresponds with the depth of a needle-shaped crystal over which that last incremental step proceeds and at the depth where dopant concentration versus mother element concentration should be measured). In the other embodiment wherein globular powdery phosphor crystals are grown according to the method of the present invention, q equals a value of 2 μm (and its last 1/10th part of the incremental step thus equals 0.2 μm–q/10–, corresponding with the depth of a globular powdery phosphor crystal over which that last 1/10th part of said incremental growth step proceeds and at the depth where dopant concentration versus mother element concentration should be measured). "Rico"-values thus obtained according to the method of the present invention should be within values between $-(q/10)^{-1}$ or −10/q and 0. The less negative (the smaller in "absolute value") the "rico" of the activator partition in the crystal is, the more homogeneous is the distribution of the activator component in the growing phos-phor crystal, whether providing a structured phosphor in needle-, prismatic-, cylindrical- or block-shaped crystal form, whether providing a globular powdery phosphor.

It is clear that not only the activator partition or distribution in the crystal is decisive in order to reach the object of obtaining the highest sensitivity possible, but that that growth cannot proceed to an unlimited amount as it is a requirement to still have a volume increase during the last incremental growth over a height of q (q corresponding with 50 µm for needles and 2 µm for globular powdery crystals), provided that said volume increase corresponds with at least 5%.

So a volume increase up to 5% over the last incremental growth step is practically attainable for globular powdery crystals, grown up to less than 80 µm, whereas for needle-shaped or equivalently shaped crystals a height q of less than 1000 µm is admitted.

In a preferred embodiment said last incremental growth providing the desired equation for the "rico" value should, according to the method of the present invention be reached for a volume growth during its last incremental growth step of at least 7.5% and in an even more preferred embodiment said volume growth should be at least 10%.

In case of a volume increase up to 7.5% over the last incremental growth step a practically attainable growth for globular powdery crystals up to less than 55 µm, and for needle-shaped or equivalently shaped crystals a height q of less than 700 µm is admitted.

Higher percentages of volume increase thus allow a growth of globular or needle-shaped crystals up to lower heights (equivalent with diameters in case of globular powdery crystals) in order to provide the envisaged homogeneous dopant or activator partition.

According to the method of the present invention the preparation of the said needle-, prismatic-, cylindrical- or block-shaped phosphor comprises as preparation steps:

mixing said matrix (or mother) component and a component containing said activator element (or dopant compound) in stoechiometric ratios in order to provide a desired phosphor composition;

milling or grinding said matrix component and activator component;

putting a mixture of said matrix component and said component containing said activator element in an inert crucible in an apparatus providing reaction under a reduced pressure atmosphere;

firing said mixture up to a temperature T, at least equal to or higher than the melting temperature $T_{melt}$ of the desired phosphor; and cooling the said phosphor.

According to the method of the present invention in the preparation of the said needle-, prismatic-, cylindrical- or block-shaped phosphor the said firing is performed in order provoke vapor deposition of the resulting phosphor onto a substrate, said vapor deposition being performed by a method selected from the group consisting of physical vapor deposition, thermal vapor deposition, chemical vapor deposition, electron beam deposition, radio frequency deposition and pulsed laser deposition.

According to the method of the present invention said reduced pressure atmosphere, mentioned above, is in the range of 1 mbar or lower (e.g. $10^{-4}$ to $10^{-5}$, and even to $10^{-6}$ mbar). Furtheron according to the method of the present invention said reduced pressure atmosphere is a reducing atmosphere.

According to the method of the present invention the preparation of globular (powdery) phosphors comprises as preparation steps:

mixing said matrix (mother) component and a component containing said activator element (dopant compound) in stoechiometric ratios in order to provide a desired phosphor composition;

milling or grinding said matrix component and activator component;

firing (calcinating) said mixture up to a temperature T, from $T_{melt}-100°$ C. to $T_{melt}+100°$ C., wherein melting temperature $T_{melt}$ represents the melting temperature of the desired phosphor; and cooling the said phosphor.

According to the method of the present invention, before or during mixing said matrix (mother) component and said component containing said activator element (dopant) at least one anti-caking agent is added, and more preferably according to the method of the present invention, said anti-caking agent is a compound selected from the group consisting of a silica, a metal oxide (preferably aluminum oxide), a zeolite and a ceramic compound.

According to the method of the present invention, during or after cooling, an annealing step is performed, for all types of crystal shapes considered. This "annealing step" clearly has an influence on the surface condition of the phosphor crystal in that it modifies its surface conditions and is clearly applied as a last step in order to further improve the phosphor characteristics.

So according to the method of the present invention said annealing step is performed by heating said phosphor in an oxygen-containing atmosphere (more preferably in air) up to a temperature in the range from 50° C. to 400° C., more preferably in the range from 80° C. to 220° C., and even more preferably about 200° C. during a time in the range from 5 minutes to 15 hours, and more preferably from 10 minutes to 8 hours, followed by solidifying said phosphor by a cooling step.

Further according to the method of the present invention said annealing step is performed in an atmosphere containing oxygen or in air.

In another embodiment according to the method of the present invention, after cooling, said globular powdery phosphor is subjected to a grinding or milling step up to a desired average particle size.

In a preferred embodiment thereof, said grinding or milling step is performed in an Alpine mill or a planetary mill.

Even more preferably in said grinding or milling step an organic solvent is added. As a preferred organic solvent, isopropanol is frequently used.

Moreover according to the method of the present invention in said grinding or milling step a dispersing agent is further added, and in a preferred embodiment palmitate is further added.

In a preferred embodiment according to the present invention preparation of a CsBr:Eu phosphor is envisaged, wherein Europium as a dopant or activator element is present (more preferably mainly in its divalent state), wherein said phosphor is available in needle-form or in powder-form, depending on the preparation method, set forth above, according to the present invention.

More particularly, when structured needles or powdery globular crystals have to be ground or milled, it is necessary to start with a phosphor crystal wherein the activator compound or dopant, and more particularly the desired divalent Europium, is homogeneously distributed in the phosphor crystal as otherwise unpredictable results regarding distribution or partition of the Europium activator will appear over the phosphor particle fragments.

The method of the present invention disclosed herein is particularly useful for the preparation of a phosphor, wherein said matrix (mother) component is CsBr and wherein said activator (dopant) element is Eu.

According to the method of the present invention said activator element Eu is generated from phosphor precursors selected from the group consisting of $EuX_2$, $EuX_3$, EuOX and $Cs_xEu_yX_{x+\alpha y}$, wherein x/y>0.25, and wherein $\alpha \geq 2$, and wherein X is a halide selected from the group consisting of Cl, Br and I and combinations thereof. In a preferred embodiment said Eu is generated from $EuBr_3$ and is present in the CsBr:Eu phosphor in a divalent state in an amount of at least 99.9 mole %, and even more preferably in an amount of at least 99.99 mole %.

While the present invention will hereinafter be described in connection with preferred embodiments as in the examples thereof, it will be understood that it is not intended to limit the invention to those embodiments.

EXAMPLES

Preparation of the Phosphor Samples (Homogenized Phosphor Powder)

A. CEBLA8501/01/1: 530 g of CsBr powder and 1656 mg of $EuBr_3$ solution (containing 0.002 mole of $EuBr_3$) were mixed for 30 minutes in a Turbula apparatus from WAB, Switzerland.

The pulverized powder was dried in a nitrogen atmosphere at 140° C. for 30 minutes.

The powder mixture was heated up in 2 hours from 140° C. to 575° C. (in the vicinity of the melting temperature) and then heated in a nitrogen atmosphere for 6 hours.

The (molten) powder was cooled within a time of 30 minutes in nitrogen atmosphere (annealing step under inert atmosphere) followed by an annealing step under air atmosphere starting at a temperature of 200° C. a time of 4 hours.

Homogenization of the melt to differing smaller diameters was performed with an Alpine Mill from Alpine Montan AG—Austria—at 3500 r.p.m. under an atmosphere of 3 bar.

Experiment 1 (Comparative): CEBLA8501/01/1M Phosphor

This "Alpine Mill", from Alpine Montan AG—Austria— was homogenising the phosphor powder with phosphor particles, doped with Eu in an amount of 1145 p.p.m.

Said particles having an average height (diameter) of less than 20 μm, led to a calculated "rico" value of −4.75; and did not lead to an optimized sensitivity of the dopant in the matrix component.

Experiment 2 (Comparative) CEBLA8501/01/1H Phosphor

This phosphor was a slightly—by hand, instead of by means of an Alpine Mill—homogenized phosphor powder, the particles of which were having an average height (diameter) of more than 100 μm, and were doped with Eu in an amount of 1262 p.p.m.

A calculated "rico" value of −4.50 thus obtained was higher and was leading to an increased sensitivity. Those phosphor particles however were too large and were not suitable for practical use in the preparation of a phosphor screen.

Results obtained with those 2 phosphor layers have been summarized in Table 2.

Experiment 3: CEBLA8516/01/1

530 g of CsBr powder and 828 mg $EuBr_3$ solution (0.001 mole of $EuBr_3$) were mixed for 30 minutes in same Turbula apparatus from WAB, Switzerland. The powder was dried in a nitrogen atmosphere at 140° C. for 30 minutes.

The powder mixture was heated in 2 hours from 140° C. to 575° C. (in the vicinity of the melting temperature) and then heated in a nitrogen atmosphere for 6 hours.

The (molten) powder was cooled within a time of 30 minutes in nitrogen atmosphere (annealing step under inert atmosphere) followed by an annealing step under air atmosphere starting at a temperature of 200° C. for a time of 4 hours.

The mixture was homogenized with a planetory mill, 5-25 agate stones having a diameter of less than 1 cm, in the presence (8516/02/1PK-8516/07/1PK) and in the absence of isopropanol (8516/01/1PK). CEBLA 8516/01/1 was the non-milled reference material.

Data obtained with respect to emitted radiation after exposure to UV-radiation having a wavelength of 254 nm and 365 nm have been summarized in Table 1, as well as data about average particle size after milling with a planetary milling apparatus (PK), Eu content (expressed in p.p.m.) and sensitivity referred to a reference sample MD10 (after X-ray exposure and stimulation, and read-out in different digitizers—called NOLO® and SOLO® respectively).

From some of the samples the Europium dopant partition was determined with TOF SIMs.

TABLE 1

| CEBLA8516 | /01/1 | /01/1PK | /02/1PK | /03/1PK | /04/1PK | /05/1PK | /06/1PK | /07/1PK |
|---|---|---|---|---|---|---|---|---|
| Average Particle Height-μm | More than 100 | 11.3 | 67.2 | 22.0 | 20.6 | 10.5 17.6* | 2.7 | 9.4 |
| Eu-content (p.p.m.) | 717 | 710 | 468 | 663 | 623 | 658 | 672 | 678 |
| UV 254 nm | | Dead pink | | | | | Pink** | Dead pink |
| UV 365 nm | Blue (intense) | Dead purple | Blue | Faint Blue | Fainter Blue | Faintst Blue Blue-purple* | ** | Dead purple |

TABLE 1-continued

| CEBLA8516 | /01/1 | /01/1PK | /02/1PK | /03/1PK | /04/1PK | /05/1PK | /06/1PK | /07/1PK |
|---|---|---|---|---|---|---|---|---|
| SOLO-% sens | 1210 | | 349 | 178 | 145 | 69/124* | | |
| rico | −4.11 | −4.75 | | | | | | |
| NOLO-% sens | 84.7 | 2.9 | 106 | 58.8 | 32.5 | 11.7/32.3* | 2.3 | 3.2 |

(*Palmitate **No sensitivity)

It is concluded from the Table 1 hereinbefore that homogenization always causes loss in sensitivity, which sounds very logic, the more when average phosphor particle sizes are further reduced, but that in the presence of isopropanol (and still more preferably in the additional presence of palmitate), loss is smaller than in the absence thereof. For a comparable average particle size said loss in sensitivity is reduced with a factor of about 3-4 (see comparative 01/1PK and inventive 05/1PK). "Rico"-values for non-milled phosphors are less negative than for milled powders as further becomes clear from the Table 1.

Experiment 4: Samples CB59612A, CB59507A, CB59501A, CB50215A were prepared by a melt process of a CsBr doped with a Eu-derivative, in combination with a low vacuum ($<10^{-3}$ bar). Average height of the needle-shaped phosphor particles and Europium concentration (in p.p.m.) have been given in the Table 2 hereinafter and besides the sensitivity (in percentage versus a reference material MD10), the "rico" value and a value for p/g was calculated as performed in U.S. application Ser. No. 2003/0,047,697, referred to in the "background of the present invention" as prior art phosphor. All measurements on powders were performed with a TOF-SIMS analysis apparatus, followed by calculation of the results as requested within the scope of the present invention. Measurements on the needles were performed with ICP OES, combined with sandblasting.

The incorporation of the Europium dopant in globular powder phosphors prepared according to the method of the present invention clearly shows a low "rico"-value. Those values, measured over a phosphor particle depth of 0.2 μm are less than −5.0 and preferably less than −4.5 as envisaged.

The incorporation of the Europium dopant in needle-shaped phosphors prepared according to the method of the present invention even shows a lower "rico"-value. Said "rico"-values, measured over a phosphor particle depth of 5 μm, are less than −0.2 and preferably less than −0.05 and clearly correspond with the desired homogeneous dopant distribution over those needle-shaped phosphors.

From the Table 2 it is further concluded that a higher sensitivity is attained with the powder phosphor which has a lower "rico" value (better homogeneously distributed Eu-dopant or -activator, even for the largest powders having a height of more than 100 μm, doped with about 1200 p.p.m. of Europium verus the CsBr matrix).

In order to reach an optimized relationship between phosphor particle size, sensitivity, amount of activator or dopant versus mother or matrix compound and a homogeneous partition or distribution of said activator or dopant in the said mother or matrix compound, the present invention offers an excellent method, wherein, making use of the calculated "rico"-values, derived from experimental concentration measurements as defined herein. After performing the described measurements, providing ability to calculate said value, a quantitative measure and identification of said

TABLE 2

| | CB59612A | CB59507A | CB59501A | CB50215A | CEBLA* 8501011M | CEBLA* 8501011H |
|---|---|---|---|---|---|---|
| Height | 390 μm | 140 μm | 220 μm | 75 μm | <20 μm | >100 μm |
| Eu-content | 20 ppm | 200 ppm | 700 ppm | 335 ppm | 1145 ppm | 1262 ppm |
| "rico"-value | −0.0006 | −0.0065 | −0.0033 | −0.039 | −4.75 | −4.50 |
| p/g | 0.750 | 0.112 | 0.283 | 0.80 | 0.6 | 0.5 |
| % Sensit. vs. MD10 | 272 | 528 | (1016) | 272 | 140 | 828 |

*CEBLA-experiments as described above (A. CEBLA8501/01/1).

It is concluded from that Table 2 that a higher (less negative) "rico"-value, which is indicative for a more homogeneous incorporation of the Europium dopant in the needle shaped phosphors also provides a higher sensitivity.

It is also concluded from that Table 2 that lower amounts of Europium are leading to higher (less negative) "rico"-values, corresponding with lower absolute values, which is indicative for a more homogeneous incorporation of the Europium dopant in the needle shaped phosphors.

Opposite thereto p/g values are higher and are not below the preferred 0.1 value known from U.S. Ser. No.2003/0,047,697.

unique phosphors, whether prepared in globular powder form, whether vapor-deposited in needle-shaped, prismatic-, cylindrical- or block-shaped phosphor crystal form.

Experiment 5: Sample FA337259

Analysis of the needles, prepared according to the same method as in Experiment 4 and analysis of the needle-shaped phosphors was performed with ICP OES, combined with a laser ablation apparatus starting from the top of the needles.

Thickness changes for each step of 5 μm ablation, as well as the complementary remaining thicknesses have been given, together with amounts of Eu-dopant as detected and corresponding "rico" values calculated as defined hereinbefore.

Table 3 hereinafter provides a summary of these results.

From the figures summarized therein it is clear that all of the "rico" values are within the desired boundaries (between −0.20 and 0 for needle-shaped phosphors), which is illustrative for a homogeneous distribution, to a larger or lesser extent, within the consecutive segments of the needles of the needle-shaped phosphor.

As is further illustrated by the figures given in the Table 3, Europium dopant concentrations tend to decrease when proceeding laser ablation and analyzing europium dopant amounts (expressed in p.p.m.) in depth.

TABLE 3

| Needle length | 75 μm | 70 μm | 65 μm | 60 μm | 55 μm |
|---|---|---|---|---|---|
| −q/10 | −5 μm | −5 μm | −5 μm | −5 μm | −5 μm |
| % needle lenght reduction (μm) | 0.06667 | 0.0714286 | 0.07692 | 0.0833 | 0.0909 |
| % remaining complementary needle length | 0.93333 | 0.9285714 | 0.92308 | 0.9167 | 0.909 |
| Eu concentration (p.p.m.) | 343 | 297 | 265 | 235 | 220 |
| Rico | — | −0.0268* | −0.0216 | −0.0219 | −0.0136 |

*Simulation of the calculation of the first ablation step: $[(Eu_{(at\ depth=9/10)} - Eu_{(at\ surface)}) : Eu_{(at\ surface)}] \times 1/(0.1 \times q) = [(297-343) : 343] \times 1/5 = 0.0268$ Having described in detail preferred embodiments of the current invention, it will now be apparent to those skilled in the art that numerous modifications can be made therein without departing from the scope of the invention as defined in the appending claims.

What is claimed is:

1. Method of preparing a phosphor comprising the step of growing its surface by firing or evaporating as components composing the said phosphor, a matrix component and a dopant activator element, wherein growing said phosphor, during a last incremental growth before ending said growth, proceeds over a distance q, expressed in μm, in its largest direction, provided that an increase of the said phosphor in volume, expressed in volume percentage, is more than 5%; characterized in that an activator element partition, determined before and after growth of a surface layer of said phosphor over a distance corresponding with q/10 satisfies the condition:

$$-(q/10)^{-1} < rico < 0$$

wherein said "rico" value, expressed in μm$^{-1}$, is calculated as a ratio of
concentration differences of said activator concentration (1), determined at a depth of q/10 under said surface and said activator concentration (2) determined at said surface, and
said activator concentration (2) determined at said surface,
divided by the product of 0.1 times q.

2. Method according to claim 1, wherein q equals a value of 50 μm for needle-, prismatic-, cylindrical- or block-shaped phosphor crystal and wherein its largest direction is its height direction.

3. Method according to claim 2, comprising as preparation steps:
mixing said matrix component and a component containing said dopant activator element in stoechiometric ratios in order to provide a desired phosphor composition;
milling or grinding said matrix component and dopant activator component;
putting a mixture of said matrix component and said component containing said dopant activator element in an inert crucible in an apparatus providing reaction under a reduced pressure atmosphere;
firing said mixture up to a temperature T, at least equal to or higher than the melting temperature $T_{melt}$ of the desired phosphor;
cooling the said phosphor.

4. Method according to claim 3, wherein the said firing is performed in order provoke vapor deposition of the resulting phosphor onto a substrate, said vapor deposition being performed by a method selected from the group consisting of physical vapor deposition, thermal vapor deposition, chemical vapor deposition, electron beam deposition, radio frequency deposition and pulsed laser deposition.

5. Method according to claim 4, wherein before or during mixing said matrix component and said component containing said dopant activator element, at least one anti-caking agent is added.

6. Method according to claim 5, wherein said anti-caking agent is a compound selected from the group consisting of a silica, a metal oxide, a zeolite and a ceramic compound.

7. Method according to claim 3, wherein before or during mixing said matrix component and said component containing said dopant activator element, at least one anti-caking agent is added.

8. Method according to claim 7, wherein said anti-caking agent is a compound selected from the group consisting of a silica, a metal oxide, a zeolite and a ceramic compound.

9. Method according to claim 3, wherein said reduced pressure atmosphere is in the range of 1 mbar or lower.

10. Method according to claim 3, wherein said reduced pressure atmosphere is a reducing atmosphere.

11. Method according to claim 3, wherein during or after cooling, an annealing step is performed.

12. Method according to claim 11, wherein said annealing step is performed by heating said phosphor in an oxygen-containing atmosphere up to a temperature in the range from 50° C. to 400° C., during a time in the range from 5 minutes to 15 hours, followed by cooling.

13. Method according to claim 3, wherein said phosphor is subjected to a further heating step, by heating to a temperature T in the range from 50° C. to 400° C., during a time in the range from 5 minutes to 15 hours, followed by solidifying said phosphor by a cooling step.

14. Method according to claim 1, wherein q equals a value of 2 μm for a globular phosphor crystal and wherein its largest direction is its diametrical height direction.

15. Method according to claim 14, comprising as preparation steps:
mixing said matrix component and a component containing said dopant activator element in stoechiometric ratios in order to provide a desired phosphor composition;
milling or grinding said matrix component and dopant activator component;

firing (calcinating) said mixture up to a temperature T, from $T_{melt}-100°$ C. to $T_{melt}+100°$ C., wherein melting temperature $T_{melt}$ represents the melting temperature of the desired phosphor;

cooling the said phosphor.

16. Method according to claim 15, wherein before or during mixing said matrix component and said component containing said dopant activator element, at least one anti-caking agent is added.

17. Method according to claim 16, wherein said anti-caking agent is a compound selected from the group consisting of a silica, a metal oxide, a zeolite and a ceramic compound.

18. Method according to claim 15, wherein after cooling said phosphor is subjected to a grinding or milling step up to a desired average particle size.

19. Method according to claim 18, wherein said grinding or milling step is performed in an Alpine mill or a planetory mill.

20. Method according to claim 18, wherein in said grinding or milling step an organic solvent is added.

21. Method according to claim 18, wherein in said grinding or milling step a dispersing agent is further added.

22. Method according to claim 1, wherein components composing the said phosphor are a matrix component $(1-a)M^IX.aM^{II}X_2$, wherein M(I) is at least one of monovalent Li, Na, K, Rb or Cs, M(II) is a divalent metal element selected from the group consisting of Mg, Ca, Sr, Ba and Ni;

X is a halogen atom selected from the group consisting of F, Cl, Br and I; wherein $0 \leq a < 0.5$; and a dopant activator element Ln, wherein Ln stands for Sc, Y, La, Ce, Pr, Nd, Pm, Sm, Eu, Gd, Tb, Dy, Ho, Er, Tm, Yb, Lu, Al, Bi, In or Ga.

23. Method according to claim 1, wherein said matrix component is CsBr and wherein said dopant activator element is Eu.

24. Method according to claim 23, wherein said dopant activator element Eu is generated from phosphor precursors selected from the group consisting of $EuX_2$, $EuX_3$, EuOX and $Cs_xEu_yX_{x+\alpha y}$, wherein $x/y>0.25$, and wherein $\alpha \geq 2$, and wherein X is a halide selected from the group consisting of Cl, Br and I and combinations thereof.

25. Method according to claim 23, wherein said Eu is generated from $EuBr_3$ and is present in the CsBr:Eu phosphor in a divalent state in an amount of at least 99.9 mole %.

* * * * *